(No Model.)
C. F. BRUSH.
METHOD OF PREPARING GLASS FOR CEMENTATION.
No. 331,764. Patented Dec. 8, 1885.
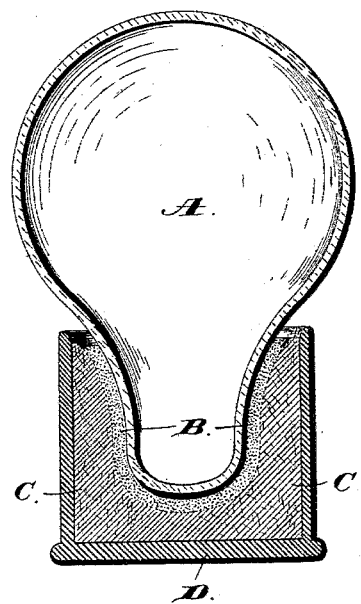
WITNESSES
Jas. E. Hutchinson
S. G. Nottingham
INVENTOR
Chas. F. Brush
By H. A. Seymour, Attorney

UNITED STATES PATENT OFFICE.

CHARLES F. BRUSH, OF CLEVELAND, OHIO.

METHOD OF PREPARING GLASS FOR CEMENTATION.

SPECIFICATION forming part of Letters Patent No. 331,764, dated December 8, 1885.

Application filed August 21, 1885. Serial No. 175,011. (No specimens.)

*To all whom it may concern:*

Be it known that I, CHARLES F. BRUSH, of Cleveland, in the county of Cuyahoga and State of Ohio, have invented certain new and useful Improvements in Methods of Preparing Glass for Cementation; and I do hereby declare the following to be a full, clear, and exact description of the invention, such as will enable others skilled in the art to which it appertains to make and use the same.

My invention relates to an improvement in the method of preparing glass for cementation.

Hitherto it has been customary to fix incandescent-lamp bulbs and other similar articles into sockets by means of a cement composed of plaster-of-paris or analogous substance. It has been found difficult, however, to obtain a perfect and permanent junction between the glass and the cement, the smooth surface of the glass not affording a hold for the cement. This is especially noticeable where the portion of the glass to be cemented is of a round shape.

The object of my invention is to provide a method of procedure by which the glass may be firmly cemented in position, and held for an indefinite long time without liability of working loose.

With this end in view my method consists in, first, coating the glass with a preparation which will tenaciously adhere thereto; secondly, embedding granulated material in the said coating before it hardens; and, thirdly, applying the cement in the ordinary manner to the roughened surface.

To illustrate the method above briefly outlined, I have shown its application to the bulb of an incandescent lamp, and the further explanation of the method will be made in connection therewith, although I do not wish to be understood as limiting its use to that or any particular form or class of objects.

In the accompanying drawing, A represents the bulb of an incandescent lamp; D, the socket in which it is set; C, the plaster or cement; and B, the coating, which adheres tenaciously to the glass, with the granulated material embedded therein, the whole being shown in vertical section. The preparation B, with which the glass is coated, is of such a nature that when it dries it will be hard, and will cling tenaciously to the glass. An alcoholic solution of shellac varnish forms a very effective preparation for this purpose. Before the varnish hardens the portion of the glass coated therewith may be dipped in dry sand, powdered glass, or similar granulated material; or the sand, powdered glass, &c., may be sprinkled thereon; or the granulated material might be introduced into the varnish coating before it is applied to the glass, and the two applied simultaneously. When the varnish, with the granulated material embedded therein, has become thoroughly dry, the exterior surface of the coating B will be rough, and will afford an excellent retaining-surface for the plaster or other form of cement. The portion of bulb A provided with the roughened surface, is placed within the socket D, and the plaster or other form of cement C is placed around it in the ordinary manner.

Having fully described my invention, what I claim as new, and desire to secure by Letters Patent, is—

1. The method of preparing glass for cementation, consisting, essentially, in coating the glass with a preparation which will cling tenaciously thereto, and providing the said coating preparation with granulated material, substantially as set forth.

2. The method of preparing glass for cementation, consisting, essentially, in first coating the glass with a preparation which will adhere tenaciously thereto, and, secondly, embedding hard granulated material in the coating before it hardens, substantially as set forth.

3. The method of setting a glass bulb in a socket, consisting, essentially, in coating the glass with a varnish or other preparation, which will cling tenaciously thereto, embedding hard granulated material in the coating, and applying a plaster or other cement to the roughened surface, substantially as set forth.

In testimony whereof I have signed this specification in the presence of two subscribing witnesses.

CHARLES F. BRUSH.

Witnesses:
J. POTTER,
ALBERT E. LYNCH.